United States Patent [19]
Jines

[11] Patent Number: 5,454,441
[45] Date of Patent: Oct. 3, 1995

[54] METHOD AND APPARATUS FOR TRANSPORTING PORTABLE UPRIGHT STAGE PANELS

[75] Inventor: Michael D. Jines, Owatonna, Minn.

[73] Assignee: Wenger Corporation, Owatonna, Minn.

[21] Appl. No.: 214,610

[22] Filed: Mar. 17, 1994

[51] Int. Cl.$^6$ ..................................................... B60V 1/00
[52] U.S. Cl. ......................... 180/125; 414/676; 52/238.1
[58] Field of Search ................................. 180/116, 125, 180/126; 414/676; 472/75, 76, 77, 78, 79; 52/126.1, 7, 238.1

[56] References Cited

U.S. PATENT DOCUMENTS

| | | | |
|---|---|---|---|
| 3,202,232 | 8/1965 | Rogers | 180/125 X |
| 3,828,884 | 8/1974 | Burdick | 180/125 |
| 4,240,773 | 12/1980 | Terry | 180/125 X |
| 5,115,608 | 5/1992 | Abraham et al. | 52/238.1 |
| 5,308,218 | 5/1994 | Kobayashi et al. | 180/125 X |

FOREIGN PATENT DOCUMENTS

| 782892 | 4/1968 | Canada | 180/125 |
|---|---|---|---|

Primary Examiner—Kevin T. Hurley
Attorney, Agent, or Firm—Patterson & Keough

[57] ABSTRACT

A transport system for improved transport of stage panels The stage panel assembly transport system includes a transport sled and a modified stage panel assembly support base adapted for detachable engagement with the transport sled. The transport sled uses an air cushion support to lift a substantial portion of the weight of the stage panel assembly, with the remaining portion of stage panel assembly's weight being stably supported by a castor wheel arrangement.

20 Claims, 12 Drawing Sheets

METHOD AND APPARATUS FOR TRANSPORTING PORTABLE UPRIGHT STAGE PANELS

FIELD OF THE INVENTION

This invention relates generally to stage backdrop panels and more specifically to a method and apparatus for transporting portable stage backdrop panels over a stage floor.

BACKGROUND OF THE INVENTION

The practice of staging productions for theater and musical concerts in the same performance facility has necessitated the development of flexible stage layouts. The general purpose approach to the utilization of such facilities has encouraged the use of movable stage backdrop panels. A production team is able to set up any number of stage layouts by simply moving the needed backdrops into position on the stage floor.

Examples of stage panels supported in a generally vertical orientation range from solitary panels supporting scenery to integrated stage backdrop setups enclosing three sides of a stage with multiple panels positioned next to each other to complete the enclosure. Where more than one panel is needed, it is important that adjacent panels be correctly aligned. Each panel edge should be capable of abutting and engaging an adjacent panel edge. This is useful for presenting visually clean lines to the audience, and to ensure proper acoustics.

Individual stage backdrop panels may carry vertical panel components extending thirty to forty feet and may weigh as much as two thousand pounds. The vertical stage panels are carried at the front of a support base. Counter weights are carried at the back of the support base to stabilize the panel. Despite the counterweights, the center of gravity of a vertical stage panel remains well up the length of the panel, and the high center of gravity contributes significantly to the difficulty of safely maneuvering vertical stage panels. Maneuvering this much mass and achieving alignment of upwards of forty vertical feet of panelling has proven a daunting task for stage production companies that must also ensure the safety of the personnel moving the panels into place.

One example of a panel support structure useful in this area is disclosed in U.S. Pat. No. 5,115,608 issued to Abraham et al., on May 26, 1992. The '608 patent discloses a plurality of casters in clusters mounted to the base structure in at least three positions. Each caster cluster is also capable of independent height adjustment, facilitating the leveling and alignment tasks. While a useful system, problems are still encountered. The larger and heavier panel structures continue to be difficult to precisely maneuver in increments small enough to be useful to the stage crews. Considerable time is lost in repetitive alignment attempts to achieve the final fit. An additional unanticipated difficulty is encountered in those theaters where the stage floor, for whatever reason, is no longer hard, flat and smooth. Cracks and low spots can develop in stage floors which trap caster wheels. Sudden tilt, and abrupt accelerations and decelerations of the panel structures can result.

A panel transport method and apparatus that combines ease of maneuverability and safety in the transport of portable, vertical stage panels of all weights and heights over uneven as well as hard, flat stage floor surfaces would be a welcomed improvement over previous transport mechanisms.

SUMMARY OF THE INVENTION

The present invention in large part addresses the problems outlined above. The stage panel transport assembly hereof includes a unique panel support base subassembly and a transport sled adapted for lifting engagement with the panel support base. The panel support base has a first end and a second end with a vertical panel mounted to the first end. The panel support base is supported on the floor at the first end by at least two fittings and at the second end by a plurality of caster mounting members, each member being disposed for rotation through 360 degrees about an axis. The support base fittings are adapted to detachably engage a transport sled.

The transport sled has a sled base frame with carrying flanges for detachably engaging the support base fittings of a vertical stage panel. An inflatable air cushion and air compressor are carried by the sled support base for selectively supporting the sled and an attached panel support base first end with pressurized air. The sled includes a wheel assembly that selectively supports the base frame when the sled is disengaged from a vertical stage panel. When the transport sled is engaged with the support base fittings of a vertical stage panel and the air cushion is pressurized, the support base and vertical panel attached thereto are stably supported by a cushion of pressurized air at the first end of the support base and by the caster wheels at the second end of the support base.

DETAILED DESCRIPTION OF THE INVENTION

Figure 3:
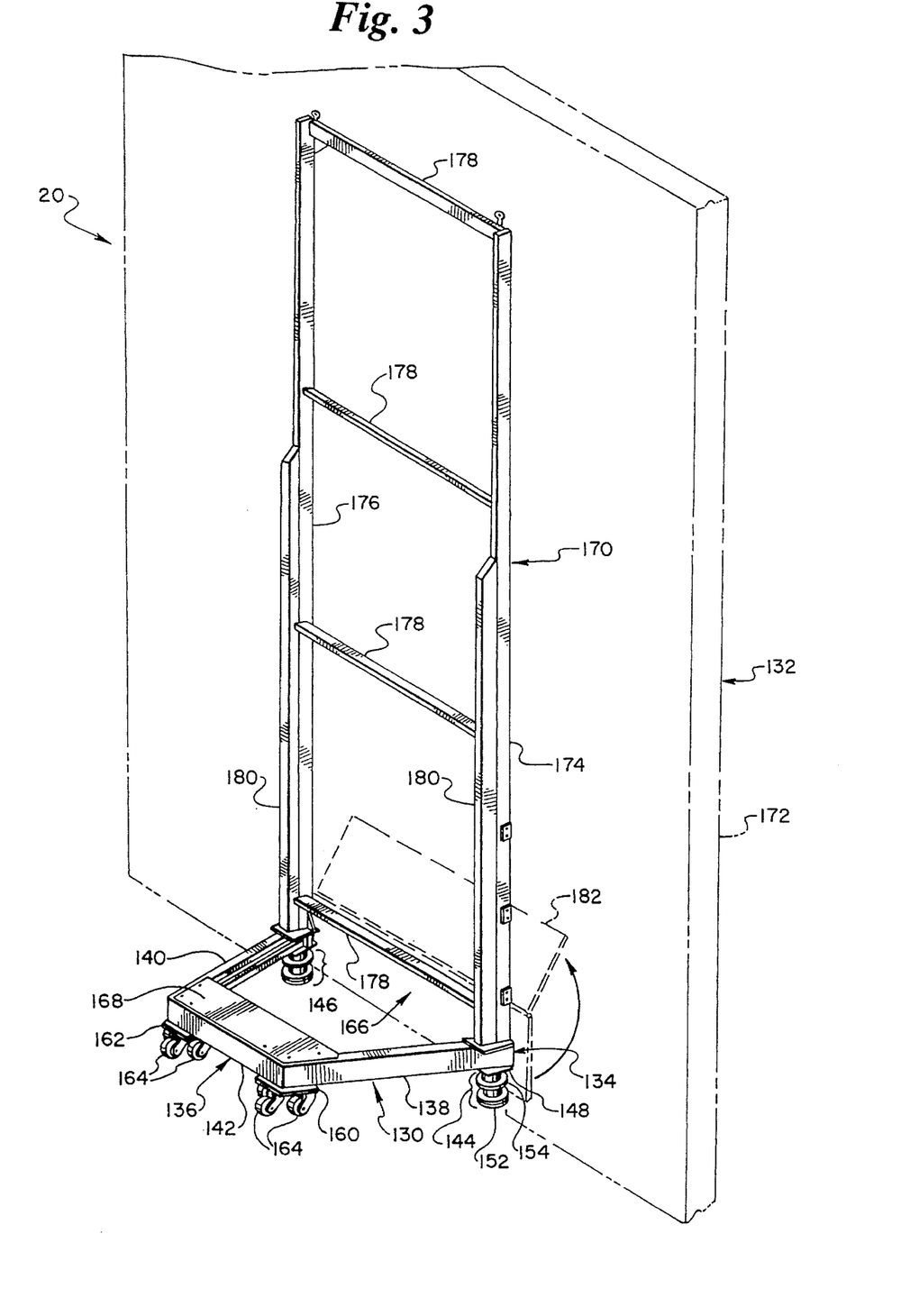
FIG. 3 is a fragmentary, perspective view depicting a portable stage panel assembly depicted from the rear, right side and slightly above, with a stage panel depicted in phantom lines.

Referring to the drawings, a portable stage panel assembly 20 is depicted in FIG. 3. A transport sled 22 is depicted, in conjunction with panel assembly 20, in FIGS. 6, 10 and 11.

Figure 1:
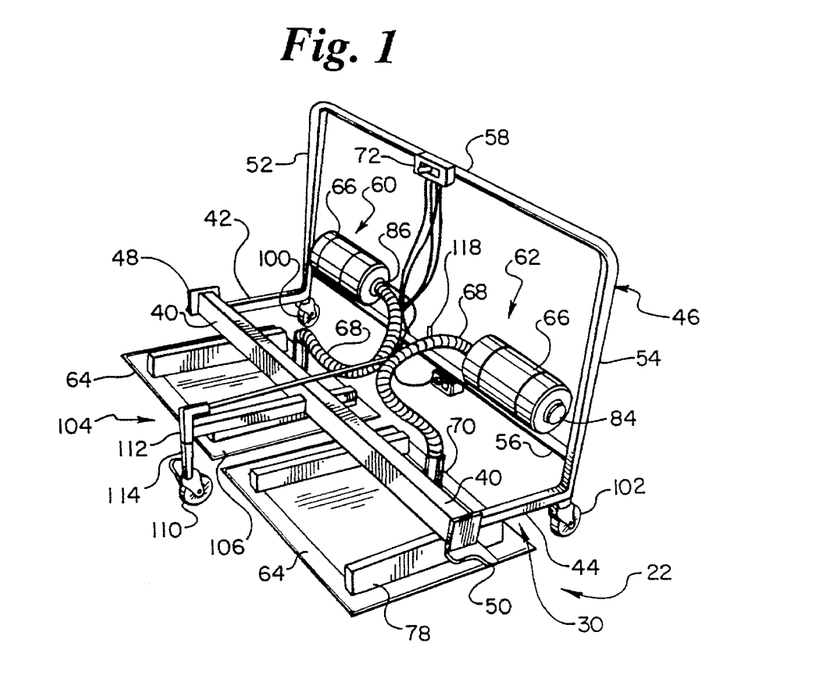
FIG. 1 is a perspective view of a stage panel assembly transport sled in accordance with the present invention, depicted from the rear, left side and slightly above.
Figure 2:
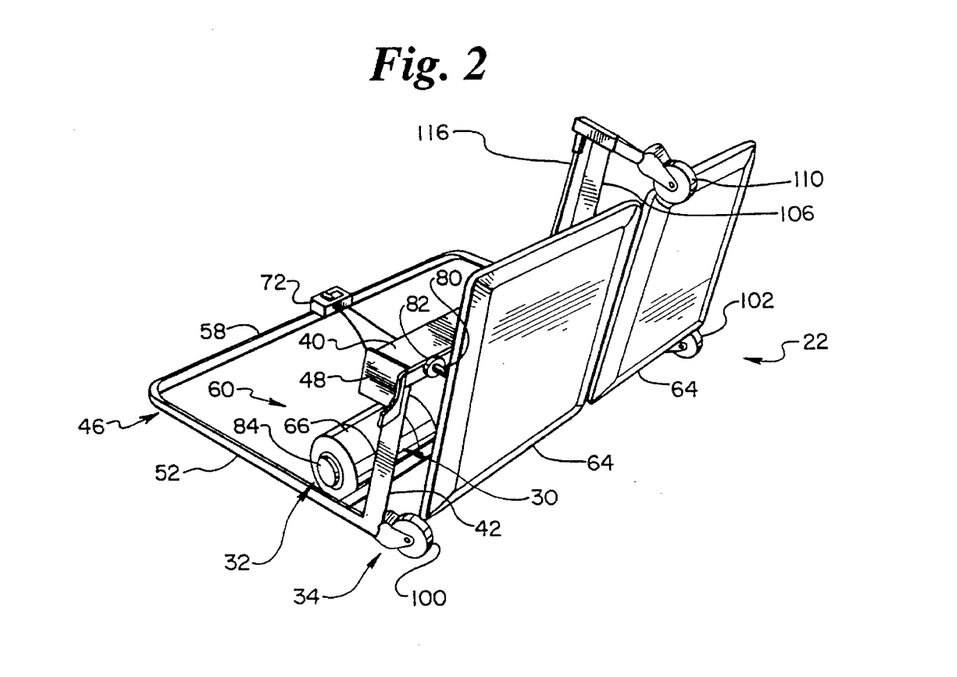
FIG. 2 is a perspective view of the sled depicted from the front, right side and slightly below.

Transport sled 22 broadly includes a sled frame 30, an air cushion support system 32 and a wheel assembly 34. Frame 30 includes a front channel 40, a right side channel 42 extending rearward from the right end of channel 40, a left side channel 44 extending rearward from the left end of channel 40, and a rear vertical assembly 46 cross connecting the rearward ends of channels 42 and 44. A right panel assembly engagement fitting 48 and a left panel assembly engagement fitting 50 extend laterally outwardly from either end of front channel 40. The transport sled frame rear vertical assembly 46 includes a right vertical channel 52 and a left vertical channel 54, both channels 52, 54 extending upwards from the respective rearward ends of right and left side channels 42 and 44. Vertical channels 52, 54 are cross connected by lower crossing channel 56 and upper crossing channel 58.

Air cushion support system 32 includes independent right and left air pressure systems 60, 62. Each air pressure system 60, 62 includes an air cushions 64, an air compressor 66, an air hose 68, an air hose connector 70, and an air compressor control 72. Alternatively, one or both of the air compressors 66 can be replaced with a tank of compressed gas 66'(see FIG. 4). Air cushion 64 includes an upper rigid back plate 74 and an inflatable elastomeric perforated lower layer 76. Each back plate 74 is connected to front channel 40 by a cushion mounting frame 78 using bolts 80 secured with nuts 82. Each air compressor 66 is mounted to lower cross channel 56 and includes an inlet 84 and an outlet 86 with outlet 86 connected to one end of a respective air hose 70. The other end of each air hose 70 is connected to a respective air cushion hose connector 88 mounted over an opening 90 in a corresponding rigid backing plate 74. Hose connectors 88 each include an upper flange 92 connected at one end to air hose 70 and secured at the other end to lower flange 94. An air flow control valve 96 is operably connected to lower flange 94.

Wheel assembly 34 includes a right rear castor wheel 100 and a left rear castor wheel 102, castor wheels 100, 102 supporting the respective rearward ends of right and left side channels 42, 44, and a front center wheel sub-assembly 104. Wheel sub-assembly 104 includes a center wheel strut 106 extending forward from the center of sled frame front channel 40, a height control assembly 108 attached at the forward extent of strut 106 and a center castor wheel 110 supporting height control assembly 108.

Figure 4:
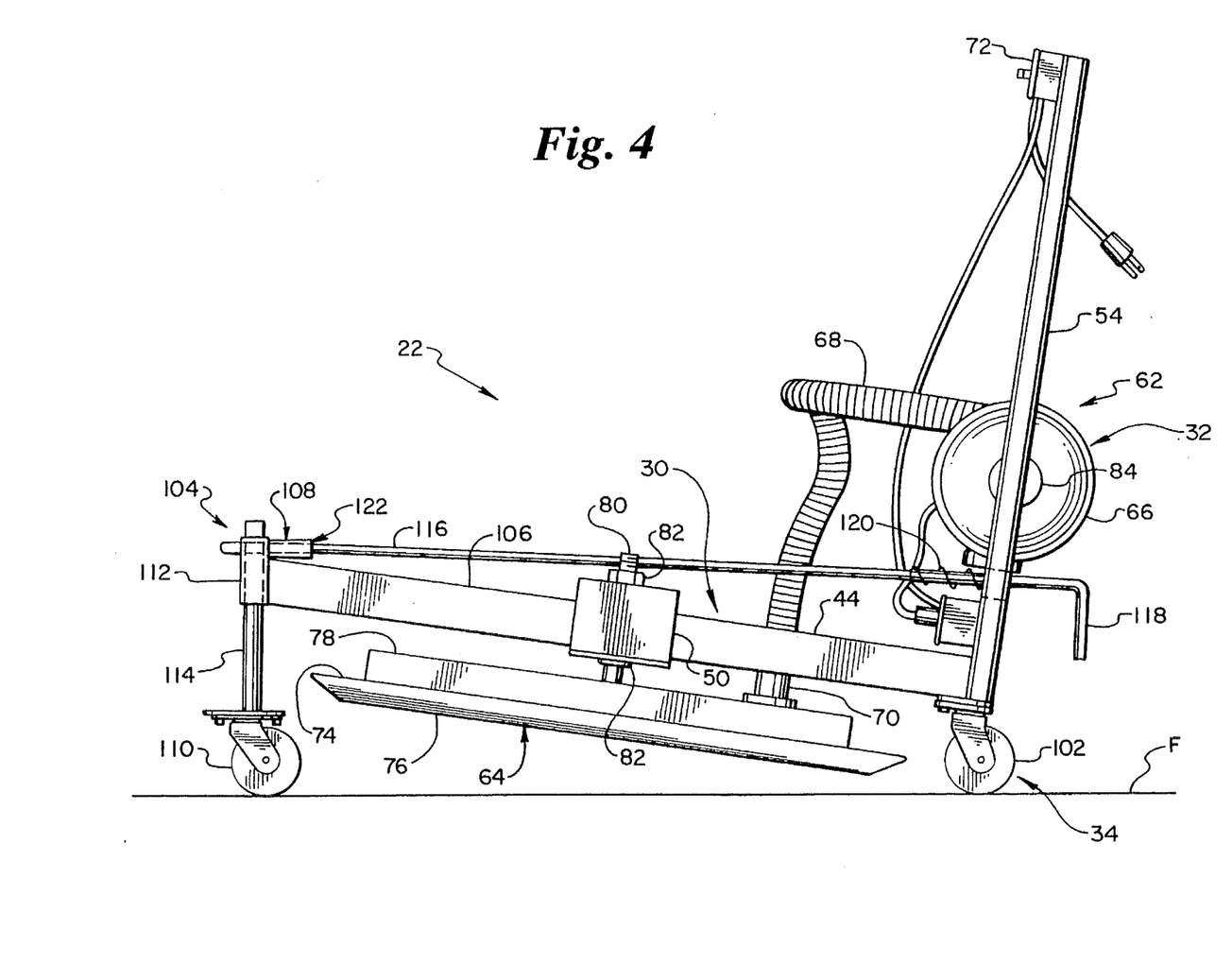
FIG. 4 is a left side elevational view of the transport sled depicted in the stage panel disengaged transport position.

Height control assembly 108 includes a hollow tubular height control sleeve 112 attached to strut 106 with sleeve 112 enclosing a center wheel post 114 to which is attached center castor wheel 94. A height control rod 116 with a rod handle 118 and a rod return spring 120 is mounted through a side hole 122 in sleeve 112 allowing access of the end of rod 116 to a height control detent 124 through post 102.

Portable stage panel assembly 20 includes support base sub-assembly 130 and a vertical panel sub-assembly 132.

Support base sub-assembly 130 is generally trapezoidal in shape oriented with a first end 134 and a second end 136 with a right side frame 138 and a left side frame 140 linked at the second end 136 by cross frame 142. The generally trapezoidal shape of support base sub-assembly 130 defines an opening 166 at first end 134.

A right footing assembly 144 and a left footing assembly 146 are mounted at first end 134 on the undersurface of the respective side frames 138, 140. Each footing assembly 144, 146 includes a mounting plate 148 connecting a tubing 150 at one end to side frames 138, 140 and having a footing flange 152 at the other end. A transport sled annular disc receiving flange 154 is mounted on tubing 150. Receiving flange 154 and panel assembly engagement fittings 48, 50 on transport sled 22 are adapted for mutual engagement.

A right castor mounting member 160 and a left castor mounting member 162 are connected to the undersurface of side frames 138, 140 at second end 136. Each castor mounting member 160 includes a plurality of castor wheels 164. A counter weight box 168 is included at second end 136 between side frames 138, 140.

Vertical panel sub-assembly 132 includes a generally vertical frame 170 and a backdrop panel 172. Vertical frame 170 includes a right vertical extending member 174 and a left vertical extending member 176 that are cross connected by a plurality of cross stays 178. The lower end of each vertical extending member 174, 176 is mounted to the respective side frame 138, 140 at first end 134. Each vertical extending member 174, 176 includes a backing piece 180. Backdrop panel 172 is connected to the first end 134 of vertical frame 170 and includes a hinged door 182 mounted at the lower end of backdrop panel 172.

Figure 12:
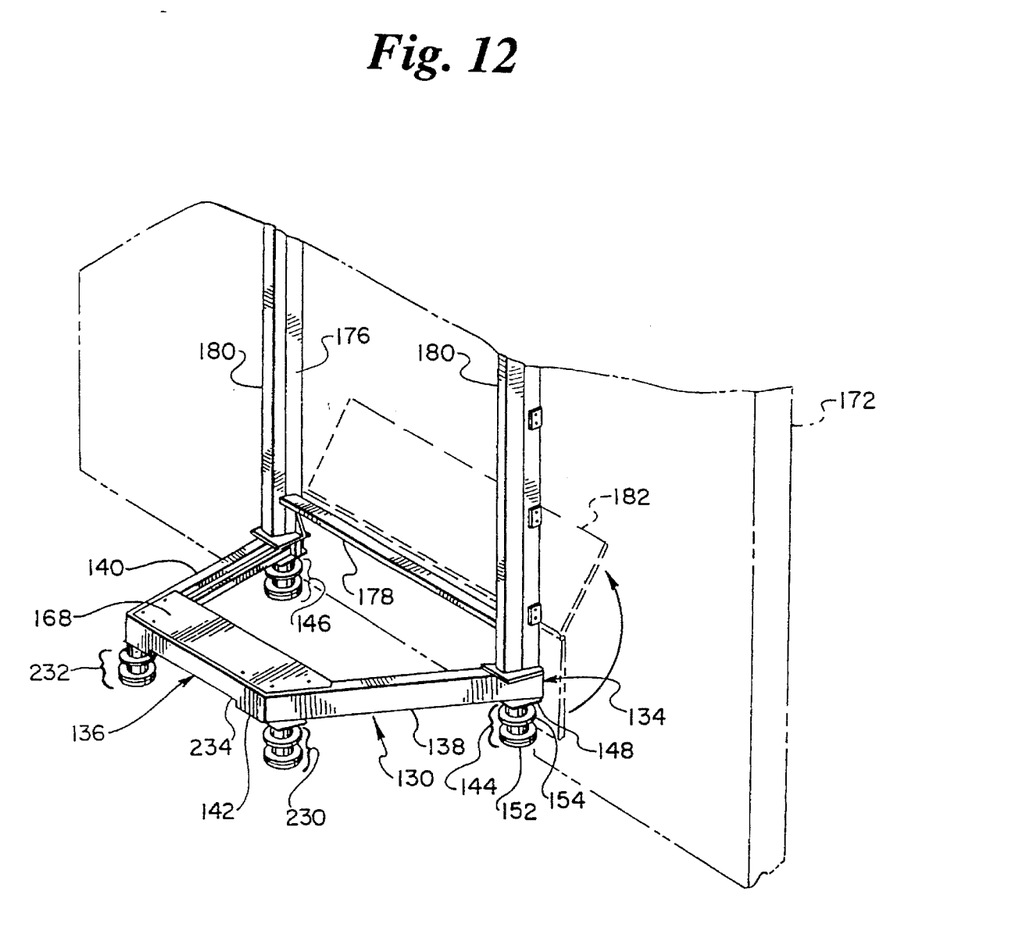
FIG. 12 is a fragmentary, perspective view depicting an alternate embodiment of a portable stage panel assembly depicted from the rear, right side and slightly above, with the stage panel depicted in phantom lines.

An alternate embodiment of a portable stage panel assembly 220 is depicted in FIG. 12. The assembly 220 is adapted for use with an alternate embodiment of a transport sled 280 depicted in FIG. 13. It will be noted that many features of the various stage panel assemblies and transport sled embodiments are identical and like reference numbers are used to annotate like elements in the figures.

Referring to FIG. 12, an alternate embodiment of a portable stage panel assembly 220 includes right and left second end footing assemblies 230, 232 at second end 136 and a recessed under surface 234 at cross frame 142. Each second end footing assembly 230, 232 includes a mounting plate 148 connecting a tubing 150 at one end to the junctions of side frames 138, 140 to cross frame 142 and having a footing flange 152 at the other end. The recessed under surface 234 includes a canted surface wedge 284 (FIG. 13) mounted to the under surface 234.

An alternate embodiment of transport sled 282 (FIG. 13) includes a forward frame assembly 240, a forward castor wheel assembly 244. Forward frame assembly 240 includes a left forward channel 246 extending forward from the left end of front channel 40 to the left end of a forward cross channel 248, and a right forward cross channel, not shown, similarly situated on the right side, a forward canted surface wedge 286 and a forward castor wheel assembly 244. Forward canted surface wedge 286 is mounted to the upper surface of forward cross channel 248. Forward castor wheel assembly 244 includes a left castor wheel assembly 290 and a right castor wheel assembly (not shown). Left castor wheel assembly 290 includes a castor mounting member 292 connected to the left end undersurface of forward cross channel 248. The right castor wheel assembly (not shown) also includes a castor member connected to the right end undersurface of channel 248. Each mounting member 292 includes a single castor wheel 294.

In operation, transport sled 22 is a stable, safe, and easy to use system for transporting stage backdrop panel assemblies across stage floors. Use of the sled 22 is best understood with reference to the operational sequence depicted in FIGS. 4,5,6,7,9,10,and 11.

Transport sled 22 is depicted in FIG. 4 in its disengaged transport position. Sled frame 30 of transport sled 22 is raised and supported by castor wheels 100, 102, 110 for movement of sled 22 across a stage floor F. Transport sled 22 can be rollably moved from one portable stage panel assembly to the next when in the configuration of FIG. 4.

Figure 5:
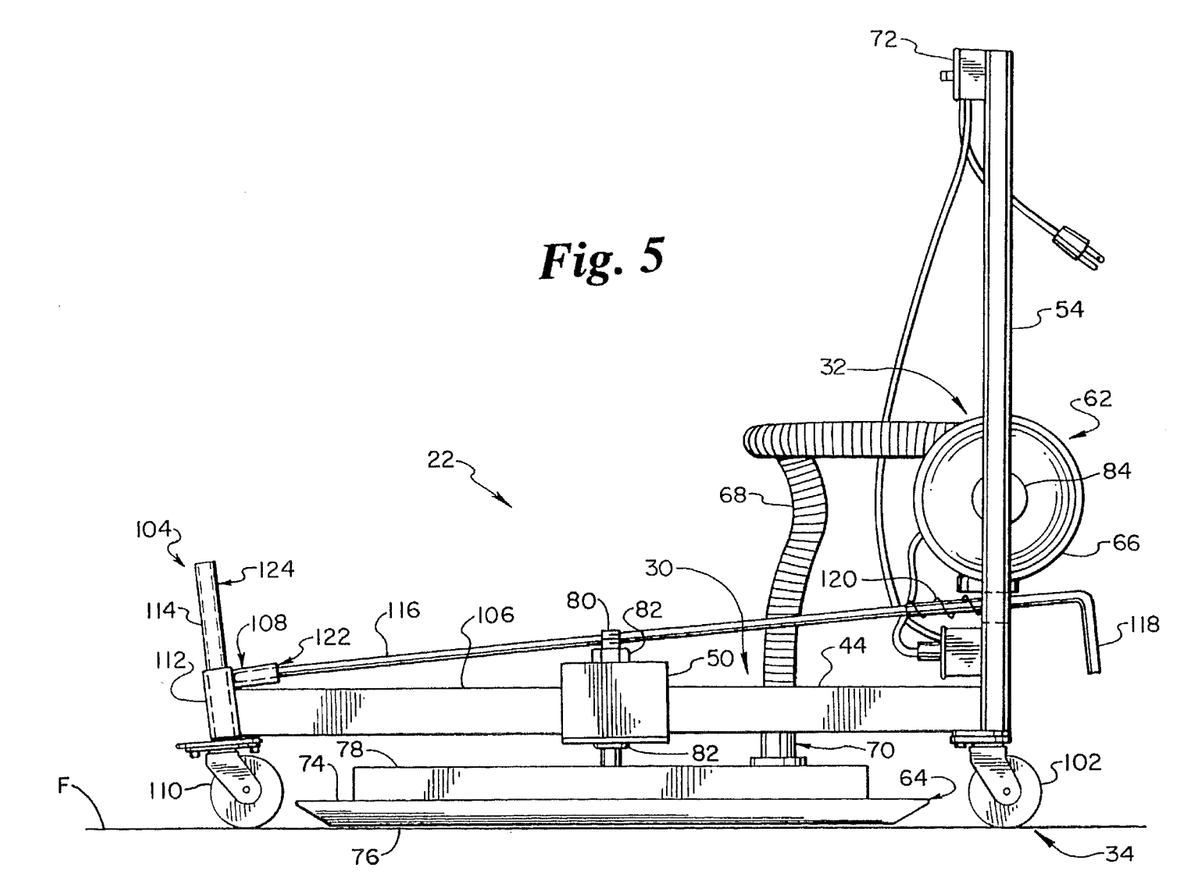
FIG. 5 is a view similar to that of FIG. 4, but with the sled depicted in the stage panel engaging position.

Transport sled 22 is depicted in the stage panel engaging position in FIG. 5. The forward castor wheel 110 is retracted, thereby lowering frame 30 of the sled, placing air cushions 64 in close proximity to the stage floor F. In particular, handle 118 of height control assembly 108 is pulled outwardly against the bias of spring 120. The end of rod 116 is accordingly retracted from detent 124 of center wheel post 114, and sleeve 112 falls downwardly along post 114 under the influence of gravity.

Figures 6, 8:
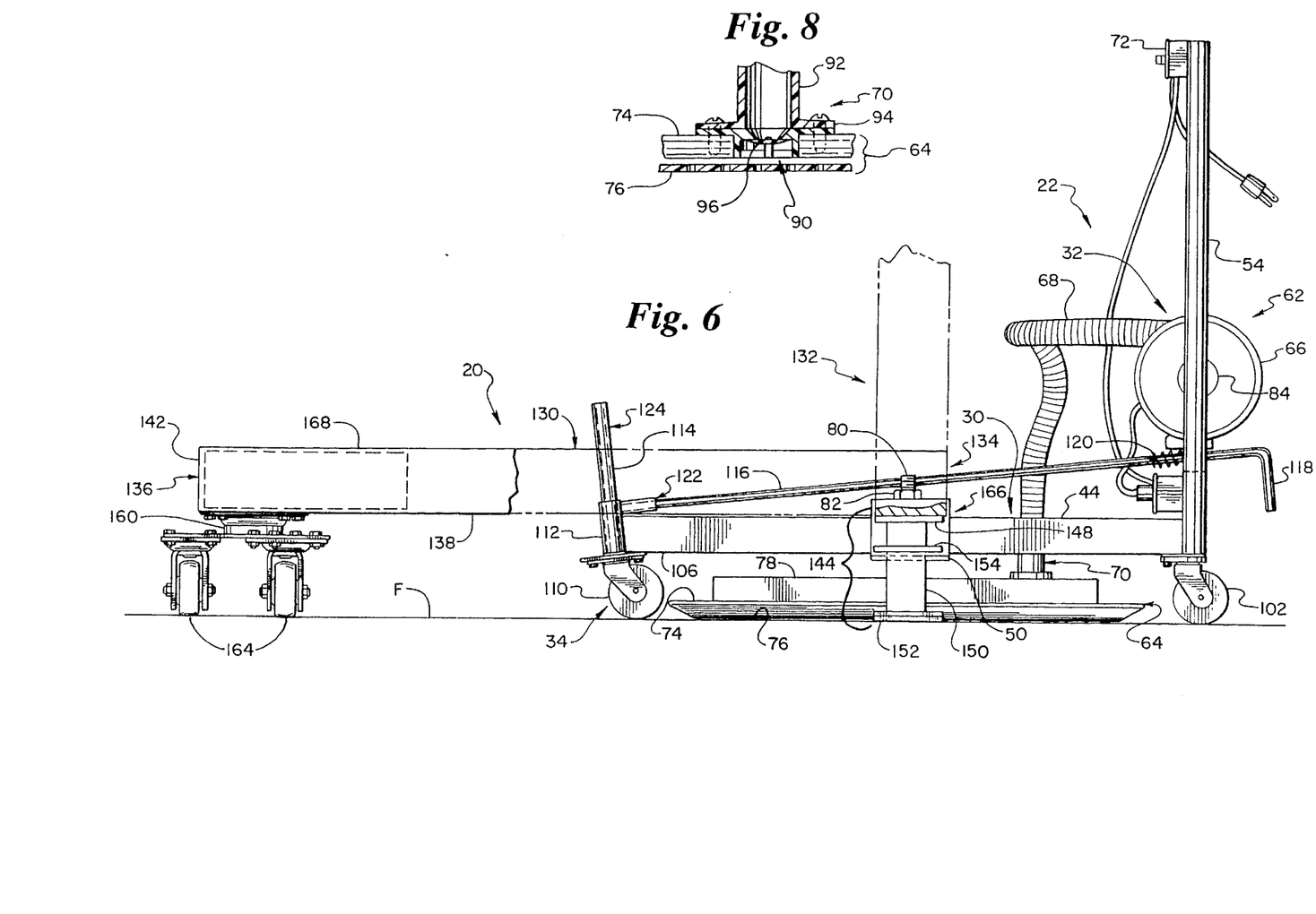
FIG. 6 is a view similar to that of FIG. 5, but with a stage panel depicted in conjunction with the sled and with the sled depicted in the docked position preparatory to inflating the air cushions.
FIG. 8 is a slightly enlarged, fragmentary sectional view taken along line 8—8 in FIG. 7.
Figure 7:
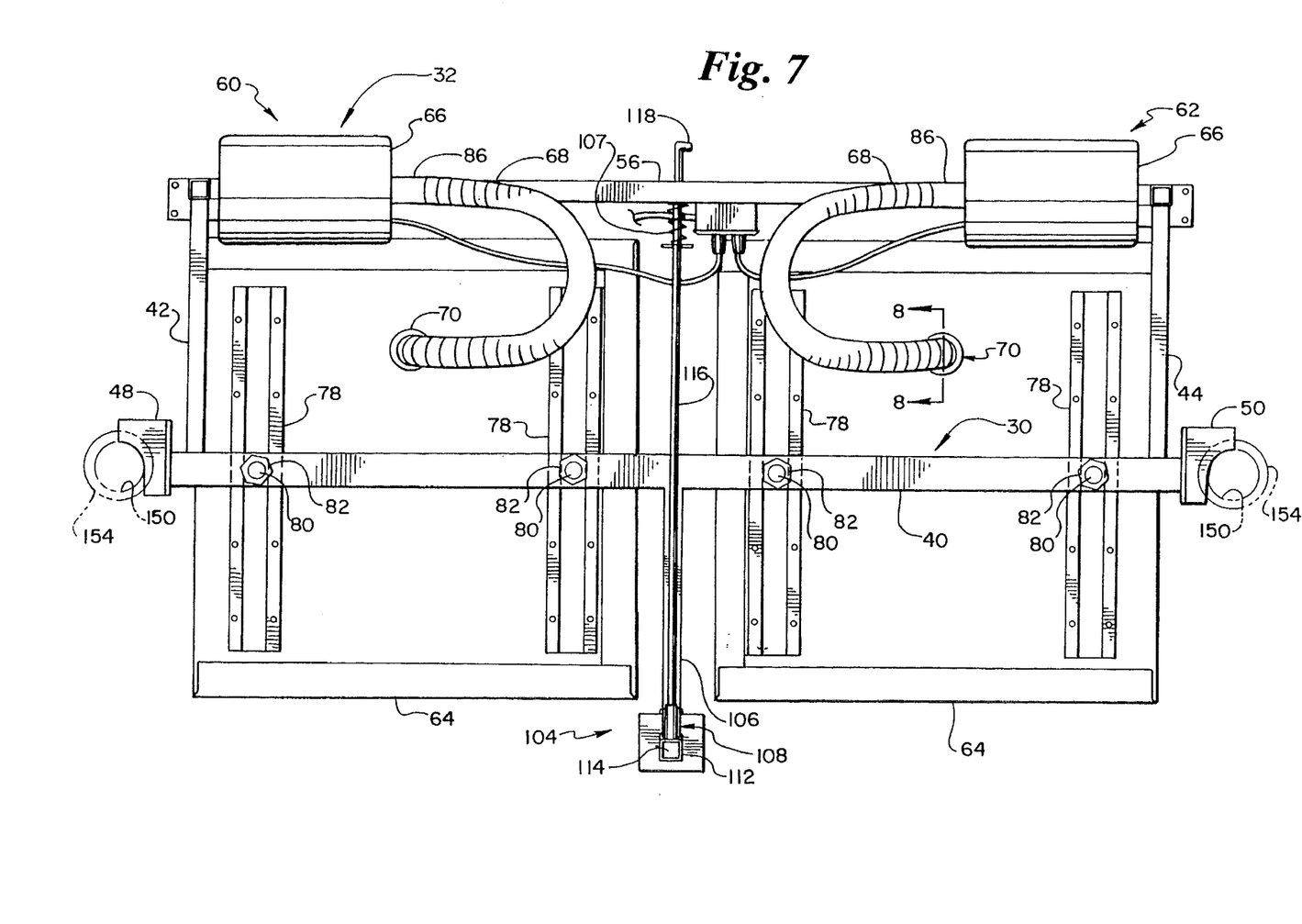
FIG. 7 is a top plan view of a transport sled with the fittings of a stage panel assembly depicted in phantom lines.
Figure 9:
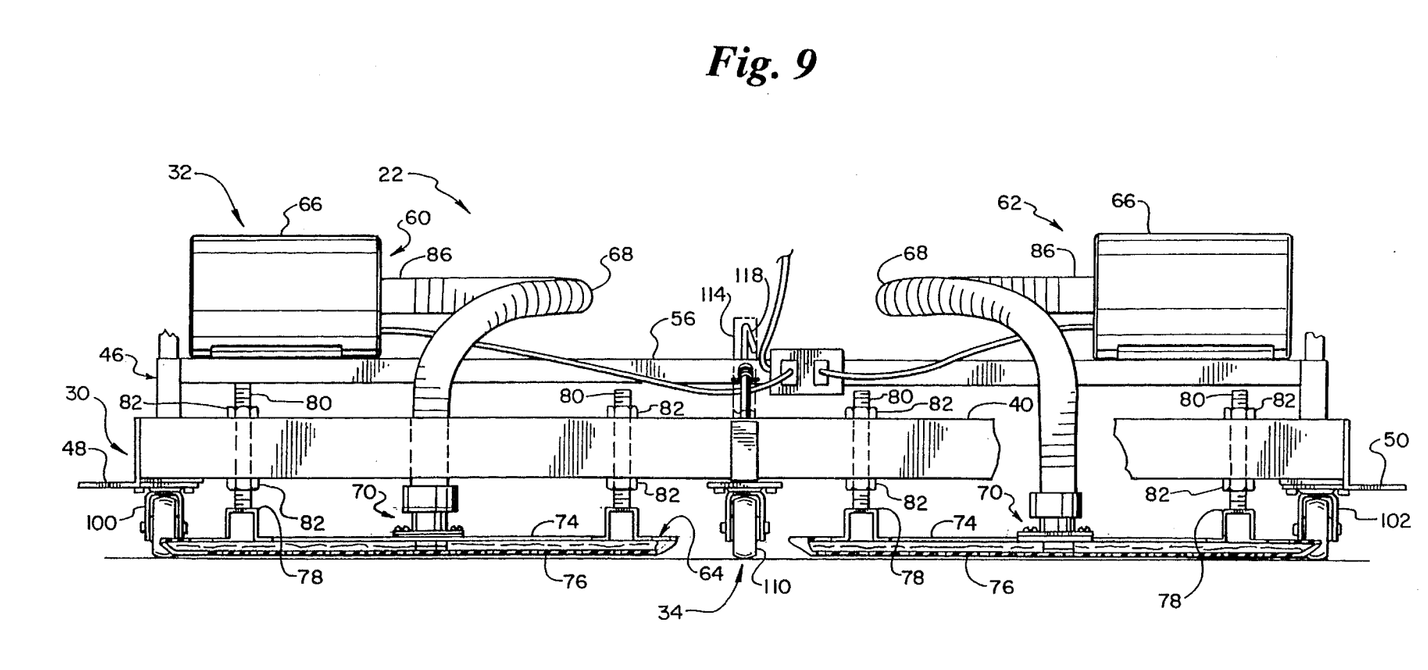
FIG. 9 is a front elevational view of the transport sled docked with a stage panel assembly.
Figure 10:
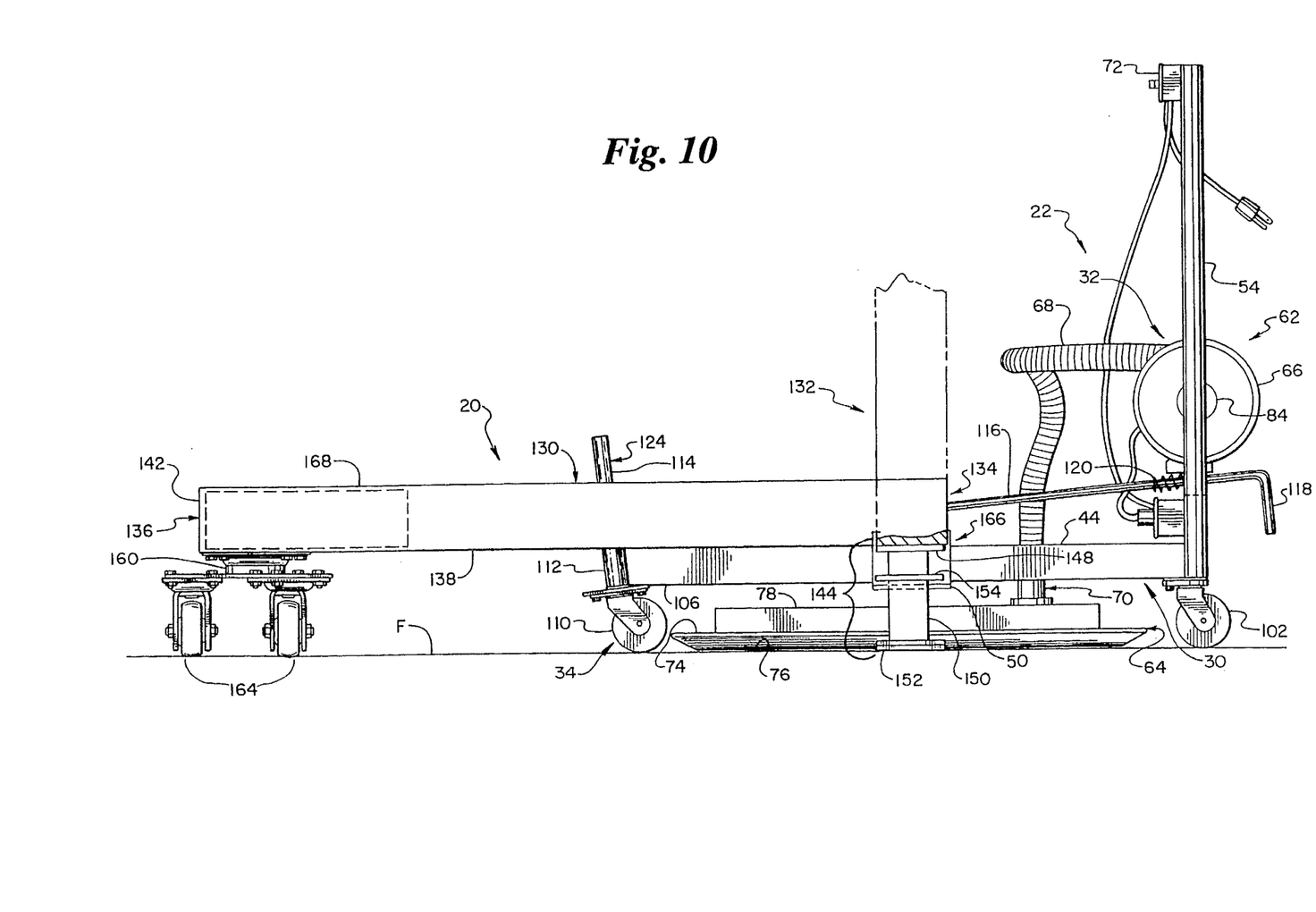
FIG. 10 is similar to FIG. 6, but with the air cushion inflated.
Figure 11:
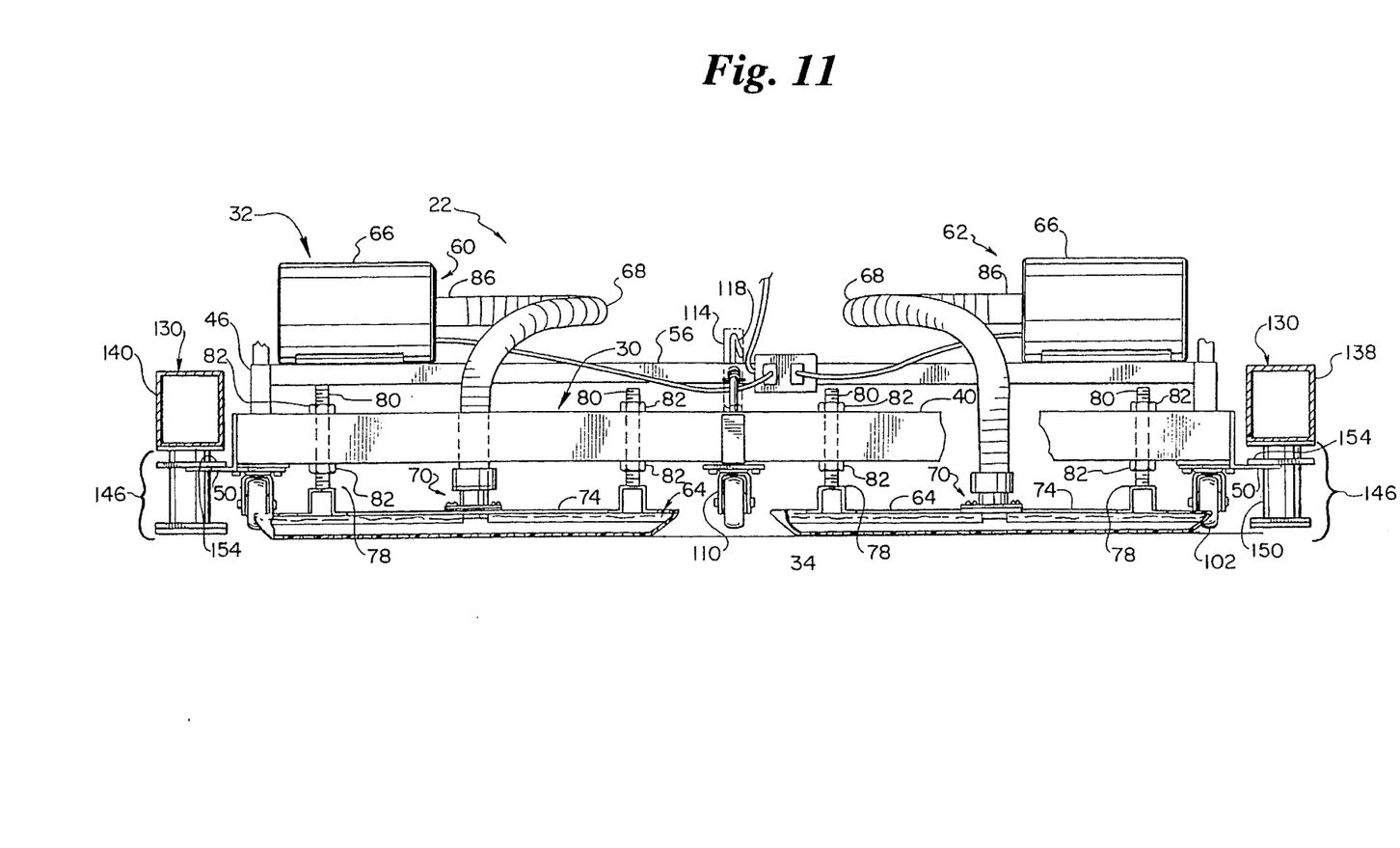
FIG. 11 is a view similar to FIG. 9, but with the air cushion inflated.

Transport sled 22 is configured in the stage panel engaging position depicted from various perspectives in FIGS. 6, 7, and 9. Once transport sled 22 is securely docked, the air cushions 64 can be inflated by activating compressors 66 thus lifting sled frame 30 and the first end 134 of stage panel assembly 20, as depicted in FIGS. 10 and 11.

The forward end of transport sled 22 is maneuvered into opening 166, as depicted in FIGS. 6 and 7. Transport sled 22 is maneuvered until receiving flanges 154 on panel assembly 20 and panel assembly engagement fittings 48, 50 on transport sled 22 are mutually engaged. This is the docked position preparatory to commencing pressurization of air pressure systems 60, 62.

Referring again to FIGS. 10 and 11, air cushion support system 32 is depicted as pressurized with air cushions 64 inflated. The pressurized air supplied to the space defined by upper rigid back plate 74 and lower layer 76 increases the distance between these two surfaces elevating rigid back plate away from the stage floor F. This upward displacement vertically engages receiving flanges 154 and panel assembly engagement fittings 48, 50, raising footing assemblies 144, 146 off of the stage floor F. With footings assemblies 144, 146 no longer resting on the stage floor F, the weight of portable stage panel assembly 20 is carried on air cushions 64 and the plurality of castor wheels 164 at second end 136 of support base sub-assembly 130. The substantial portion of weight of the entire assembly, represented by vertical panel sub-assembly 132, is carried over the center of air cushions 64.

Air cushion lower layer 76 is constructed with numerous small perforations through its surface to allow air from the pressurized space between upper rigid back plate 74 and lower layer 76 to escape through lower layer 76 creating a thin film of air between lower layer 76 and the stage floor F. This thin film of air, released through lower layer 76, significantly reduces the coefficient of friction between lower layer 76 and the stage floor F, and the transport sled 22 can glide across the surface of the stage floor F in any direction by the simple expediency of overcoming portable stage panel assembly 20 inertia through forces applied to rear vertical assembly 46. The large surface area of lower layer 76 substantially decreases the likelihood that air cushions 64 will become entrapped on an uneven or cracked stage floor. Furthermore, the large surface area of lower layer 76 provides a substantially increased and inherently more stable support base than the castor wheel assemblies that transport sled 22 replaces.

Because panels such as backdrop panel 172 tend to be large and heavy the center of gravity for portable stage panel assembly 20 is toward first end 134. This results in an inherent instability which is partially compensated by the placement of weights, not shown, into counter weight box 168. The number of counter weights, and thus the total weight, can be varied depending upon the height and weight of the panel being carried by support base sub-assembly 130.

The height of air cushion support system 32 relative to the stage floor F can be adjusted by adjusting air cushion bolts 80 using nuts 82. This fine height adjustment is accomplished with air cushion support system 32 in a non-pressurized state with air cushion upper rigid backing 74 and air cushion lower layer 76 adjacent to each other.

Figure 13:
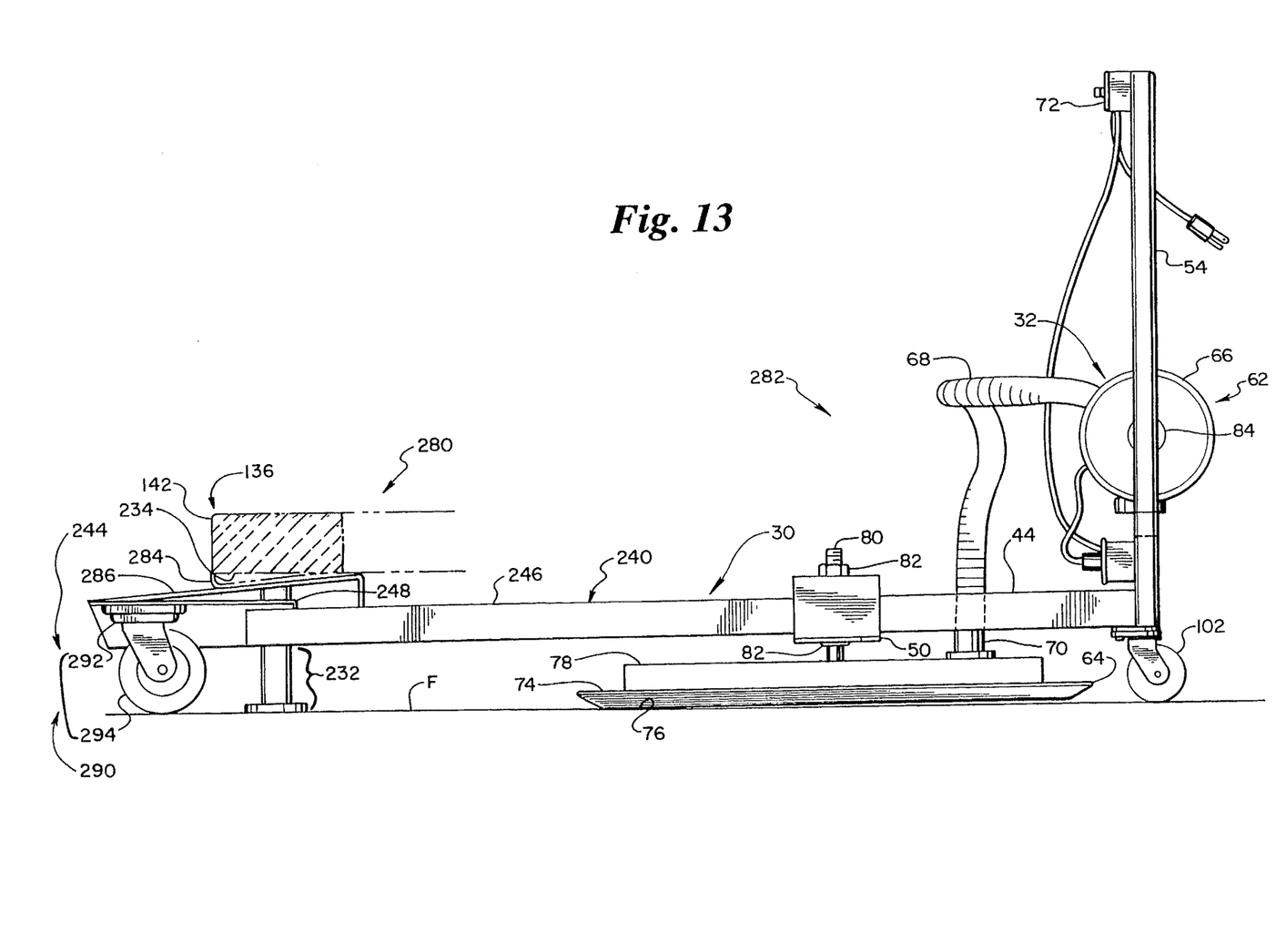
FIG. 13 depicts an alternate embodiment of a stage panel assembly transport sled with a fragmentary, elevational view of the stage panel of FIG. 12 depicted in conjunction with the sled and with the sled depicted in the docked position preparatory to inflating the air cushions.
Figure 14:
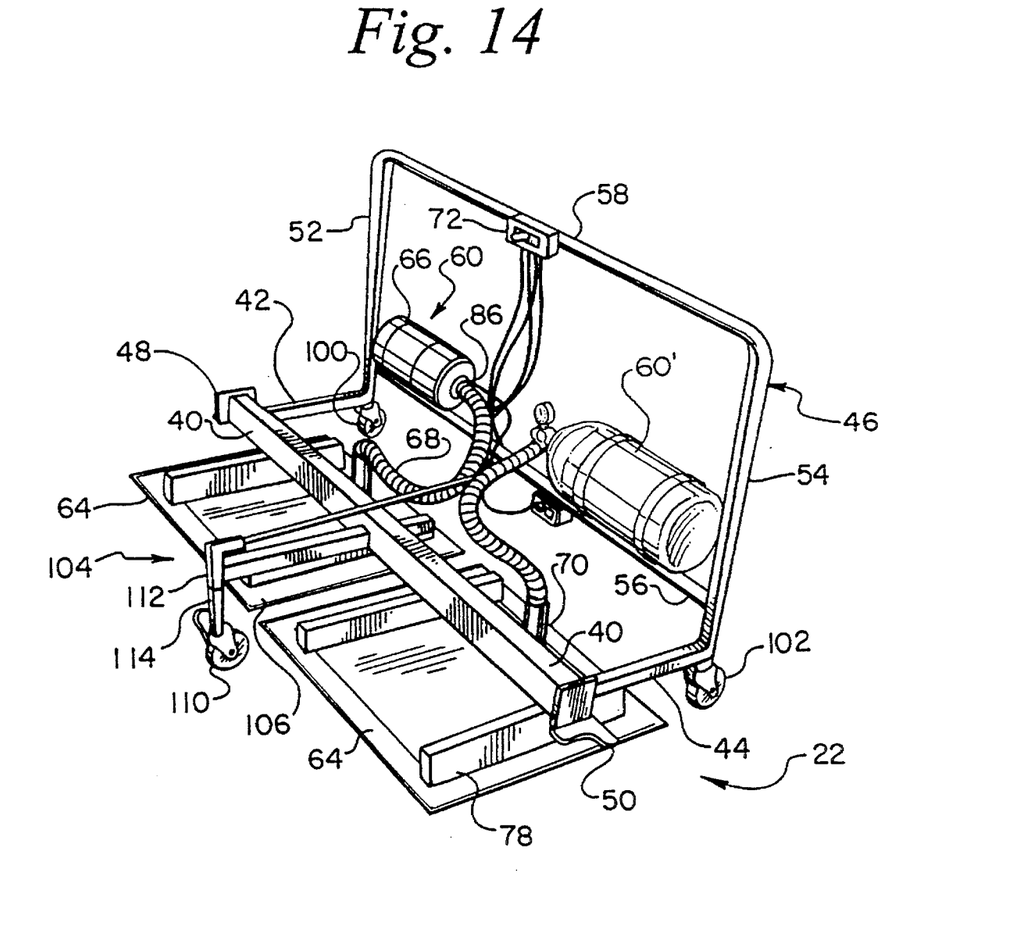
FIG. 14 is a view, similar to FIG. 1, but with one of the air compressors replaced with a tank of compressed gas.

Operation of the alternate embodiments of stage panel assembly 280 and transport sled 282 depicted in FIG. 13 will now be described. Mutually engaging canted surface wedges 284, 286 of the panel assembly 280 and sled 282 engage when the sled 282 is inserted to the docked position depicted in FIG. 13 to provide the point of lift at second end 136 of portable stage assembly 280. When air pressure systems 60, 62 are activated, the lifting effort of air cushions 64 is transmitted with a levered effect, with forward frame assembly 240 acting as lever and forward castor wheel assembly 244 acting as a fulcrum. The leverage action results in a lifting of second end 136, bringing footings 230, 232 off of stage floor F. The amount of lift provided is proportional to the lengths of the lever arm presented by the forward channels 246 and forward cross channel 248. The weight of stage panel assembly 280 is now borne by air cushions 64 at first end 134 and forward castor wheel assembly 244 at second end 136. It is anticipated that different combinations and types of wheel assemblies may be substituted for forward wheel assembly 244 besides the rotatable plurality of wheels in assembly 244 and the single rotatable mount cambered wheel in assembly 290. Alternatively, castor wheel assemblies may be non-cambered or the mounts nonrotatable.

It will be appreciated that the unique arrangement supporting the first end 134 of portable stage panel assembly 20 with an essentially frictionless cushion of air, while supporting the second end 136 of the stage panel assembly 20 by a castor assembly, provides for a uniquely stable, safe, and efficient method of transporting stage panels. Significant improvement in these areas is achieved as a result of several factors.

One factor is the large surface area of air cushions 64 providing a large base of support virtually eliminating difficulty with dangerous tilting during transport. Safety to personnel operating these transport systems is substantially increased. A second factor is the replacement of castor wheels by footings at the corners of first end 134 of base sub-assembly 130. Footings such as footing assemblies 144, 146 have increased stability because of a larger surface area of contact with a stage floor and not being able to spin. Additionally, castor wheels limit spin with locking mechanisms, but locking necessitates use of additional mechanisms that add to the risk of failure.

Additionally, efficiency is improved because of the ease of use. Even the largest and heaviest panels are easily nudged into place because of the decreased friction of the air cushions versus castor wheels only. The incorporation of a device for providing an air cushion transport system increases the ease with which these large heavy structures may be moved about a stage floor. Because of the increased ease of use, the time necessary to position these panels in a side by side fashion and/or store the panels is substantially decreased.

As depicted, transport sled 22 is an interchangeable apparatus which can detachably engage a multiplicity of portable stage panel assemblies. It is not beyond the scope of this invention or unanticipated that a permanently attached transport sled could be incorporated within a portable stage panel assembly such that each stage panel assembly would have its own transport sled with air cushion support system. It is further anticipated that receiving flange 154 and panel assembly engagement fittings 48, 50 may be constructed to provide lesser or greater degrees of contact and possibly include clamping means to increase security of the junction. It is envisioned that one embodiment anticipates use of a permanent connection.

We claim:

1. A transport sled for transporting vertically oriented stage panels along a stage floor, each stage panel including a support base having opposed first and second ends, stage floor engaging wheels operably coupled to the second end of said support base for rollably carrying the base along the stage floor, and sled receiving fittings operably coupled to the first end of said support base for detachably receiving said sled, the sled comprising:

a sled base frame;

carrying means operably carried by said base frame for detachably engaging said sled receiving fittings; and air cushion support means operably carried by said base frame for selectively supporting the first end of said support base whereby said stage panel is selectively supportable by said wheels and said air cushion means for stable transport of said stage panel across said stage floor.

2. The transport sled of claim 1 in which the carrying means comprises a plurality of flanges.

3. The transport sled of claim 1 in which the carrying means comprises at least two horizontally oriented laterally positioned flanges.

4. The transport sled of claim 1 in which the air cushion means comprises:

an air pressure source;

at least two inflatable air cushions connected to the air pressure source; and control means, connected to the air pressure source, for controlling inflation of the at least two inflatable air cushions.

5. The transport sled of claim 4 in which the air pressure source is an air compressor.

6. The transport sled of claim 4 in which the air pressure source is a tank of compressed gas.

7. The transport sled of claim 4 in which the at least two inflatable air cushions comprises a rigid backing and an elastomeric lower layer attached to the rigid backing at the edges such that the rigid backing and lower layer define a space there between that is inflatable.

8. The transport sled of claim 7 in which the elastomeric lower layer is constructed with a plurality of perforations.

9. A transport sled for transporting a panel support structure, across a stage floor, the transport sled comprising:

a base frame having an under surface and an upper surface;

a plurality of stage floor engaging wheels operably mounted to the under surface of the base frame;

engagement means operably carried by the base frame for detachably engaging the panel support structure; and an air inflatable support subsystem operably mounted to the under surface of the base frame, the subsystem comprising:

an air pressure supply;

at least one air cushion operably connected to the air pressure supply and presenting a surface to the floor; and a subsystem control means for inflating and deflating the at least one air cushion such that when inflated the air cushion is sufficient to raise the acoustic panel support structure.

10. The transport sled of claim 9 further comprising a vertical frame mounted to the upper surface of the base frame.

11. The transport sled of claim 9 further comprising wheel engagement control means interconnected between the base frame and at least one of the wheels for selectively disengaging the plurality of wheels from the floor such that the sled is lowered onto the inflatable support subsystem for acoustic panel support structure transport.

12. An improved panel support structure having a support structure frame having opposed first and second ends, a plurality of caster wheels operably rotatably coupled to the support structure frame second end for contacting a stage, the improvement comprising:

air cushion means operably connected to the support structure frame second end for supporting the first end of the support structure frame.

13. The improved panel support structure of claim 12 in which the air cushion means comprises a transport sled having a source of compressed air, at least two inflatable air cushions, and control means for inflating and deflating the at least two inflatable air cushions with air from the source of compressed air.

14. A method of transport for generally upright vertical stage panels across stage floors, the method comprising the steps of:

providing a portable stage panel support;

providing an air cushion transport sled mutually engageable with the portable stage panel support;

providing a source of pressurized air;

engaging the portable stage panel support with the air cushion transport sled;

inflating the air cushion transport sled with pressurized air from the source of pressurized air;

supporting a substantial amount of the weight of the portable stage panel support on the inflated air cushion transport sled; and moving the portable stage panel support while supported by the air cushion transport sled.

15. A transport sled for transporting a portable stage panel assembly along a stage floor, said assembly including a generally vertically oriented stage panel and a support base, the support base having opposed first and second ends, and sled receiving fittings operably coupled to the support base, the transport sled comprising:

a sled base frame;

carrying means operably carried by said base frame for detachably engaging said sled receiving fittings; and air cushion support means operably carried by said sled base frame for selectively supporting the support base whereby said stage panel assembly is selectively supportable by said transport sled for stable transport of said stage panel across said stage floor.

16. A transport system for transporting a portable stage panel assembly having a generally vertically oriented stage panel, and a panel support base having a first end and a second end, the stage panel assembly configurable in a transportable orientation for transport along a stage floor and a stationary configuration comprising:

stage floor engagement means for movably supporting said stage panel on said stage floor when said stage panel is in said transportable orientation and for fixedly supporting said stage panel on said stage floor when said stage panel is in said stationary configuration;

a transport sled including:
  a sled base frame; and
  air cushion support means operably carried by said sled base frame for selectively supporting the assembly; and carrying means for selectively detachably engaging the transport system to the panel support base whereby said portable stage panel assembly is selectively supportable by said transport system for stable transport of said stage panel across said stage floor.

17. The transport system of claim 16 in which the stage floor engagement means includes a plurality of footings operably connected to the support base and a castor wheel assembly operably connected to the sled base frame.

18. The transport system of claim 16 in which the stage floor engagement means includes at least two footings operably connected to the support base first end and at least two castor wheel assemblies operably connected to the support base second end.

19. The transport system of claim 16 in which the carrying means includes a canted surface wedge operably mounted at the second end and a mutually engageable canted surface wedge mounted at the forward end of the transport sled frame.

20. The transport system of claim 16 in which the air cushion means comprises:

an air pressure source;

at least two inflatable air cushions connected to the air pressure source; and control means, connected to the air pressure source, for controlling inflation of the at least two inflatable air cushions.

* * * * *